United States Patent
Berner

(10) Patent No.: US 10,715,889 B2
(45) Date of Patent: *Jul. 14, 2020

(54) WIRELESS COMMUNICATION METHOD AND SYSTEM

(71) Applicant: pureLiFi Limited, Edinburgh (GB)

(72) Inventor: Stephan Berner, Sofia (BG)

(73) Assignee: pureLiFi Limited, Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,404

(22) Filed: Jun. 6, 2019

(65) Prior Publication Data
US 2019/0335254 A1    Oct. 31, 2019

Related U.S. Application Data

(63) Continuation of application No. 15/752,483, filed as application No. PCT/GB2016/052510 on Aug. 12, 2016, now Pat. No. 10,327,050.

(30) Foreign Application Priority Data

Aug. 14, 2015  (GB) .................................. 1514517.0

(51) Int. Cl.
*H04Q 11/00* (2006.01)
*H04W 74/06* (2009.01)
(Continued)

(52) U.S. Cl.
CPC ....... *H04Q 11/0062* (2013.01); *H04B 10/116* (2013.01); *H04L 1/0003* (2013.01);
(Continued)

(58) Field of Classification Search
CPC .............. H04B 10/116; H04Q 11/0062; H04Q 2011/0064; H04L 1/0003; H04L 5/143; H04W 74/06; H04J 2011/0013
(Continued)

(56) References Cited

U.S. PATENT DOCUMENTS 5,046,066 A      9/1991  Messenger
9,525,486 B2 *  12/2016  Poola ................... H04B 10/116
(Continued)

FOREIGN PATENT DOCUMENTS

KR      101258058       4/2013
WO      2006134704      12/2006

OTHER PUBLICATIONS

International Search Opinion dated Jan. 5, 2017 in International Application No. PCT/GB2016/052510.
(Continued)

*Primary Examiner* — Dalzid E Singh
(74) *Attorney, Agent, or Firm* — Womble Bond Dickinson (US) LLP

(57) ABSTRACT

A wireless communication method includes sending, by a first device in a wireless network, a poll packet (32, 38, 44) for polling a second device in the wireless network. The poll packet includes an address of the second device. The second device receives and at least partially decodes the poll packet. The second device sends a response packet (36, 40, 46) in response to the poll packet. The sending of at least part of the response packet is substantially simultaneous with the receiving of at least part of the poll packet by the second device. Wireless communication systems, transmitters and receivers using the method are also described.

24 Claims, 4 Drawing Sheets

(51) Int. Cl.
*H04B 10/116* (2013.01)
*H04L 1/00* (2006.01)
*H04L 5/14* (2006.01)
*H04J 11/00* (2006.01)

(52) U.S. Cl.
CPC ............ *H04L 5/143* (2013.01); *H04W 74/06* (2013.01); *H04J 2011/0013* (2013.01); *H04Q 2011/0064* (2013.01)

(58) Field of Classification Search
USPC .......................................................... 398/58
See application file for complete search history.

(56) References Cited

U.S. PATENT DOCUMENTS

| | | |
|---|---|---|
| 2005/0025080 A1 | 2/2005 | Liu |
| 2005/0068900 A1 | 3/2005 | Stephens et al. |
| 2005/0180357 A1 | 8/2005 | Tao et al. |
| 2005/0249244 A1 | 11/2005 | McNamara et al. |
| 2006/0104301 A1 | 5/2006 | Beyer et al. |
| 2006/0221993 A1 | 10/2006 | Liao et al. |
| 2009/0022112 A1* | 1/2009 | Shin .................. H04B 10/1149 370/336 |
| 2010/0246544 A1* | 9/2010 | Brisebois .............. H04W 24/00 370/338 |
| 2010/0303096 A1 | 12/2010 | Kasher et al. |
| 2012/0320932 A1 | 12/2012 | Xu et al. |
| 2015/0043407 A1 | 2/2015 | Wang et al. |
| 2015/0181458 A1 | 6/2015 | Aryafar et al. |
| 2015/0282211 A1* | 10/2015 | Zhang .................. H04W 74/06 370/329 |
| 2016/0218804 A1* | 7/2016 | Raj ...................... H04B 10/116 |

OTHER PUBLICATIONS

Burchardt, H. et al., "VLC: Beyond Point-to-Point Communication" IEEE Communications Magazine, Jul. 2014, pp. 98-105.

Nikola Serafimovski "pureLiFi_PHY_MAC_proposal; 15/16/0004-007a-purelifi-phy-mac-proposal" IEEE Draft IEEE-SA Mentor (Jan. 8, 2016) pp. 1-44 XP068105460 802.15.

IEEE Standards Association. "Part 11: Wireless LAN Medium Access Control (MAC) and Physical Layer (PHY) Specifications", IEEE Computer Society, Feb. 6, 2012, 2792 pgs.

Search Report dated Feb. 8, 2016 in corresponding UK application No. GB 1514517.0.

* cited by examiner

WIRELESS COMMUNICATION METHOD AND SYSTEM

FIELD

The present invention relates to a wireless communication method, for example a polling method for a wireless optical network.

BACKGROUND

It is known to provide wireless data communications by using visible light (or infrared or ultraviolet light) instead of radio frequencies to transmit and receive data wirelessly between devices. Data may be transmitted using visible light by modulating an intensity of the light. The light used may be coherent or incoherent. Wireless networks using visible light may in some circumstances allow a higher data capacity and greater energy efficiency than radio frequency wireless networks, and may also be used to replace point-to-point infrastructure in locations where conventional infrastructure does not exist or is too expensive to build.

The IEEE 802.11 standard is a standard for communication over wireless networks. A wireless network may comprise an access point (AP) and several stations (STA) which each communicate with the access point. To allow multiple stations to communicate with a single access point, the IEEE 802.11 standard provides a distributed coordinated function (DCF) multiple access method and a point coordinated function (PCF) multiple access method.

In the DCF method, a station wishing to transmit data on a channel waits until the channel is not busy before sending the data. A station may transmit data to the access point on a channel once it detects that the channel is not busy for a given time interval. If the data sent by the station is successfully received, the access point sends an acknowledgement (ACK) to the station. If there are several stations, additional measures may be taken to avoid collisions occurring due to all the stations trying to send data at once when the channel ceases to be busy.

In the PCF method, the access point polls the stations sequentially. The access point may perform repeated polling cycles. In each polling cycle it may poll each of the stations in order. A given station is permitted to send data to the access point only in response to that station being polled. If a station does not have data to send, it must nevertheless respond to the poll. When an access point receives uplink data from a station it sends an ACK to acknowledge the receipt of the uplink data. When a station receives downlink data from the access point it sends an ACK to acknowledge the receipt of the downlink data.

The polling of a station in known PCF methods comprises the sending of a poll packet. The poll packet includes an address of the station to be polled and a flag that indicates that the station is being polled. The poll packet includes a MAC frame comprising a MAC header.

The 802.11 PCF method addresses a device by the MAC address of that device. The MAC address is contained in the 802.11 MAC header in accordance with the 802.11 standard (see, for example *IEEE Std 802.11-2012, Part 11: Wireless LAN Medium Access Control (MAC) and Physical Layer (PHY) specifications*). In a poll packet in accordance with the 802.11 standard, the frame control field of the MAC frame has the value for CF-Poll.

The response to a poll message by the station being polled comprises sending a response packet to the access point. The response packet sent from the polled station may also include additional payload data or ACK messages, or may be a minimal response that does not include such additional payload data or ACK messages.

The PCF method of the 802.11 standard has to follow a certain timing because it is designed to coexist with the standard access method DCF. The 802.11 PCF method must allow time intervals in which devices can transmit using DCF.

FIG. 1 is representative of a polling cycle on a simple network using the 802.11 polling scheme. The network includes one access point (AP) and two stations (STA1, STA2). A timeline 10 is shown, with time going from left to right.

Blocks above the timeline 10 represent downlink packets sent by the AP. Blocks below the timeline 10 represent uplink packets sent by stations.

At block 12, the AP polls the first station, STA1, by sending a poll packet addressed to STA1. The poll packet is received and decoded at STA1. Once the complete poll packet has been received and decoded, STA1 sends a response packet (represented by block 14) to the AP. The response packet is received and decoded by the AP.

The decoding of a packet refers to the extraction of data from the packet, and may be used to refer to or comprise demodulation techniques used to extract data from received signals.

At block 16 (which starts after the response packet of block 14 has been received and decoded), the AP polls the second station, STA2, by sending a poll packet addressed to STA2. The poll packet addressed to STA2 is received and decoded by STA2.

At block 18, after the poll packet addressed to STA2 has been received and decoded by STA2, STA2 sends a response packet to the AP. In this example, the response packet sent by STA2 at block 18 also carries a data payload.

Poll packets and response packets may carry payload data and acknowledges (ACKs) if there is anything to send. If the response packet carries a payload of data from a station, a subsequent poll packet addressing that station may include an ACK acknowledging the receipt of that payload data. If payload data is carried in the poll packet, a response to that poll packet may comprise an ACK acknowledging that payload data.

SUMMARY

In a first aspect of the invention there is provided a wireless communication method, the method comprising: sending by a first device in a wireless network a poll packet for polling a second device in the wireless network, wherein the poll packet comprises an address of the second device; receiving and at least partially decoding by the second device the poll packet; and sending by the second device, in response to the poll packet, a response packet, wherein the sending of at least part of the response packet by the second device is substantially simultaneous with the receiving of at least part of the poll packet by the second device The response packet may be sent after decoding of the address. The response packet may be sent before completion of said at least partial decoding of the poll packet.

A response procedure may be initiated by the second device before completion of said at least partial decoding of the poll packet. The response procedure may comprise the sending of the response packet. The response procedure may comprise modulating and encoding the response packet and transmitting the response packet.

The sending of the response packet may initiated before completion of decoding of the poll packet, and continue after the completion of decoding of the poll packet. The sending of the response packet may be initiated before completion of decoding of the poll packet and be completed before completion of decoding of the poll packet.

The decoding may comprise a demodulation process. The second device may send the response packet as soon as it decodes its address, instead of decoding the whole packet before sending the response packet. Sending the response as soon as it decodes the address may result in faster communications and reduced delays.

The sending of the poll packet may be on a first channel and the sending of the response packet may be on a second, different channel. The first channel and second channel may form a full duplex connection between the first device and second device. The first channel may comprise a visible light downlink. The second channel may comprise an infrared uplink.

The sending of at least part of the poll packet by the first device may be substantially simultaneous with the receiving of at least part of the response packet by the first device.

By using separate uplink and downlink channels, a full duplex connection between the first device and second device may be formed. Each of the first device and second device may receive on one channel at the same time as transmitting on the other channel. By sending at least part of a response packet simultaneously to receiving part of a poll packet, the polling procedure may be faster than if packets were not sent and received simultaneously.

The poll packet may comprise a physical layer (PHY) packet. The poll packet may comprise at least one header.

The poll packet may comprise a physical layer header, and the address of the second device may be provided in the physical layer header. The physical layer header may comprise a PHY header, for example a PHY header under IEEE 802.11.

The poll packet may be addressed using bits of the PHY header. The number of bits in the PHY header that are used to address the poll packet may determine how many devices may be addressed, for example up to 16 devices.

The packet may further comprise at least one further header, for example a MAC header, that includes an acknowledgement message. The packet may also include an additional MAC frame that carries payload data and that includes a further MAC header.

The poll packet may comprise a PHY header and a MAC header. The poll packet may be a modified PHY packet which comprises a high reliability MAC header in addition to a preamble, PHY header and payload. The address may be in the high reliability MAC header.

The poll packet may further comprise payload data and/or an acknowledgement message, and the method may comprise sending by the second device the response packet before, or without completing, decoding of the payload data and/or acknowledgement message.

The acknowledgement message may comprise an ACK, for example an ACK under IEEE 802.11.

The poll packet may comprise at least one portion that is addressed to a further device.

Said at least one portion may comprise at least one of a payload or an acknowledgement message.

The method may comprise sending by the second device the response packet without, or without completing, decoding of the payload data and/or acknowledgement message included in said at least one portion of the poll message.

A signal for one device may be included in a poll packet addressed to a different device. All devices may receive and decode all packets. Including an ACK for one device in a poll packet addressed to another device may result in faster network operation.

The first device may send a first part of the poll packet using a first rate and may send a second part of the poll packet using a second, different rate, optionally the first part of the poll packet comprising the address of the second device.

The second device may send a first part of the response packet using a first rate, and may send a second part of the response packet using a second, different rate.

The values of the first and second rates may be different for the response packet than for the poll packet.

The first and second parts may be provided in any order, for example first part before second part or second part before first part.

The first and second rates may comprise first and second modulation rates and/or channel coding rates.

The first rate may be lower than the second rate.

The poll packet or response packet may comprise an acknowledgement message, and the acknowledgement message may be provided in the first part of the poll packet or response packet. The acknowledgement message may comprise an ACK. The acknowledgement message may acknowledge receipt of data, for example a payload.

By including the ACK in the first part of the poll packet which is sent at a lower rate, the ACK may be included in the more reliable part of the transmission of the poll packet. It may therefore be more likely that the ACK will be received even if the transmission channel is degraded.

The first part of the poll packet may be considered to be a high reliability part of the poll packet. The high reliability part of the poll packet may be placed first in the poll packet (after the preamble and before any other part of the poll packet). Timing and channel estimation errors may be smallest just after a fine timing estimation and channel estimation which is performed using the preamble.

The first part of the poll packet and/or the first part of the response packet may comprise a MAC header, and the acknowledgement message may be provided in the MAC header.

The first device may be further configured to send subsequent poll packets to the second device and to at least one further device in a repeating polling sequence.

The first device may poll a plurality of devices in turn. The first device may perform a plurality of polling cycles, each polling cycle comprising polling the devices in the same order.

The first device may be configured to repeatedly poll the second device and at least one further device in a polling order.

Each of the second device and the or each further device may be configured to receive and at least partially decode all poll packets sent from the first device.

The first device may be configured to send one or more of the subsequent poll packets only if the transmission of the first poll packet is complete and no packet reception by the first device is occurring.

The method may further comprise aborting by the second device the transmission of the response packet if the second device receives a further poll packet from the first device during transmission of the response packet.

The reception of any poll packet by the second device while the second device is transmitting may indicate to the second device that the first device is not receiving its transmission. The second device may resend the response packet in the next polling cycle.

The further poll packet may be addressed to a device other than the second device.

The first device may comprise an Access Point (AP) and the second device may comprise a Station (STA).

The wireless network may comprise an optical wireless network. The optical wireless network may comprise a visible light communication (VLC) network. The wireless network may comprise at least one visible light transmission channel.

The sending of the poll packet may comprise sending the poll packet optically, and/or the sending of the response packet may comprise sending the response packet optically.

The optical wireless network may comprise a downlink between the first device and second device, the downlink having a first wavelength, and an uplink between the first device and second device, the uplink having a second, different wavelength.

By using an uplink and downlink that use different wavelengths of light, full duplex operation may be achieved. Devices may send and receive packets simultaneously. The speed of the network may be increased in comparison to a network using half duplex operation.

The wireless network may comprise a visible light downlink between the first device and second device and an infrared uplink between the first device and second device. The wireless network may comprise a full duplex wireless network system.

The poll packet may be sent via the visible light downlink and the response may be sent via the infrared uplink.

At least part of the response packet may be sent in response to the decoding of the address and before completion of said at least partial decoding of the response packet.

Said poll packet may further comprise a preamble before the address of the second device. At least part of the response packet may be sent in response to the decoding of at least part of the preamble. At least part of the response packet may be sent before completion of said at least partial decoding of the response packet.

The poll packet may be part of a sequence of polling packets addressed to different devices. The sending of the response packet in response to the decoding of at least part of the preamble may be performed in dependence on the address of at least one preceding poll packet in the sequence of poll packets.

The method may further comprise sending by the first device a previous poll packet for polling a further device in the wireless network, wherein the previous poll packet comprises the address of the further device, and wherein the previous poll packet is sent before the sending of said poll packet. The method may further comprise receiving and at least partially decoding by the second device the previous poll packet before the receiving and at least partial decoding of said poll packet. The sending of the response packet by the second device may be dependent on the address of the further device and on a polling sequence in which the further device comes before the second device.

The first device may send said poll packet after the previous poll packet without sending any intervening poll packet between the previous poll packet and said poll packet.

By receiving and decoding the previous poll packet comprising the address of the further device, the second device may determine that a packet after the previous packet (i.e. said poll packet) will be addressed to the second device. Said poll packet may be the next packet to be sent by the first device after the sending of the previous poll packet.

The second device may respond to the poll packet as soon as it receives at least part of the preamble of the poll packet. The second device may respond to the poll packet without waiting to decode its address. By responding to the poll packet without waiting to decode its address, throughput of the network may be improved. Using the address of the previous poll packet that is sent by the first device immediately before the poll packet may limit the possibility for errors in the determination of the address of the poll packet by the second device.

The poll packet may be one of a sequence of poll packets for polling the second device. The second device may be configured to respond to some and not all of the sequence of poll packets for polling the second device. The second device may be configured to respond to a proportion of the sequence of poll packets for polling the second device. The proportion may be a predetermined proportion. The proportion may be a selected proportion. The second device may be configured to respond at predetermined time intervals.

By responding to only some of the poll packets, the speed of the network may be increased. Throughput may be improved. By responding to only some of the poll packets, power efficiency of devices (for example, power efficiency of the second device) may be improved.

In a further aspect of the invention, which may be provided independently, there is provided a method comprising: sending by a first device in a wireless network a poll packet for polling a second device in the wireless network, wherein the poll packet comprises an address of the second device; receiving and at least partially decoding by the second device the poll packet; and sending by the second device, in response to the poll packet, a response packet, wherein at least part of the response packet is sent before completion of said at least partial decoding of the poll packet, optionally after decoding of the address.

In another aspect of the invention, which may be provided independently, there is provided a wireless communication method comprising transmitting a packet by a first device to at least one further device, the method further comprising transmitting a first portion of the packet using a first rate and transmitting the second portion of the packet using a second, different rate. The first and second rates may comprise first and second coding or modulation rates. The first portion may comprise a poll or a poll response. The second portion may comprise an acknowledgement message and/or a payload.

In a further aspect of the invention, which may be provided independently, there is provided an optical communication method, the method comprising sending by a first device in an optical wireless network a poll packet for polling a second device in the optical wireless network, wherein the poll packet comprises the address of the second device, and wherein the poll packet comprises at least one portion that is addressed to a further device.

In another aspect of the invention, which may be provided independently, there is provided a wireless communication method, the method comprising: sending by a device in a wireless network a packet to a plurality of further devices; wherein the packet comprises a first portion that is addressed to a first one of the further devices and a second portion that is addressed to a second one of the further devices, and the method further comprises sending the first portion of the packet at a first rate and sending the second portion of the packet at a second, different rate.

In a further aspect of the invention, which may be provided independently, there is provided a wireless communication system comprising: a first device configured to transmit a poll packet for polling a second device, the poll packet comprising an address of the second device; and the second device, wherein the second device is configured to: receive and at least partially decode the poll packet; and to send, in response to the poll packet and substantially simultaneously with the receiving of at least part of the poll packet, a response packet.

The second device may be configured to send at least part of the response packet after decoding of the address. The second device may be configured to send at least part of the response packet before completion of said at least partial decoding of the poll packet.

The wireless communication system may be configured to perform a method as claimed or described herein.

In another aspect of the invention, which may be provided independently, there is provided a transmitter configured to transmit a poll packet for polling a further device, the poll packet comprising an address of the further device included in a physical layer header of the poll packet.

In a further aspect of the invention, which may be provided independently, there is provided a receiver configured to receive and at least partially decode a poll packet, and to send a response packet in response to the poll packet after decoding of an address of the poll packet and before completion of said at least partial decoding of the poll packet.

In another aspect of the invention, which may be provided independently, there is provided a poll packet, the poll packet including an address of a device to be polled in a physical layer header of the poll packet.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting examples, and are illustrated in the following figures, in which.

Figure 1:
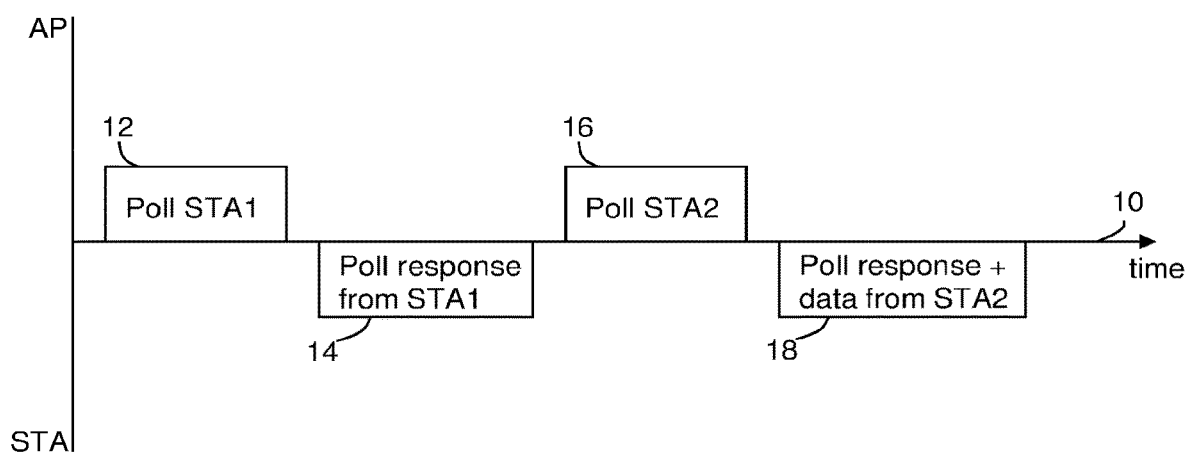
FIG. 1 is a schematic diagram representative of an AP polling two STAs using an 802.11 PCF polling scheme.
Figure 2:
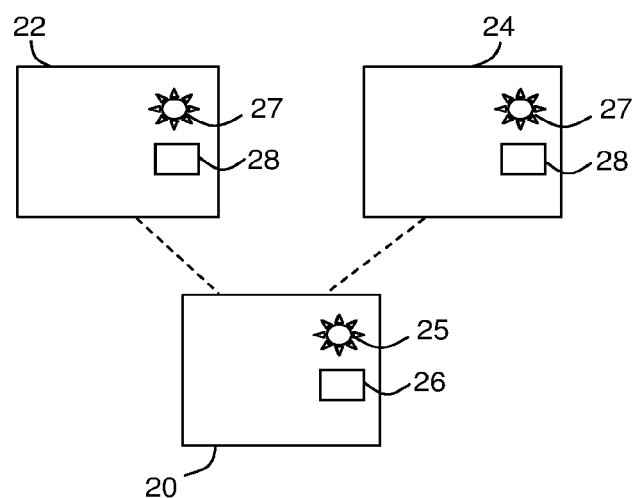
FIG. 2 is a schematic illustration of an optical wireless network according to an embodiment.

FIG. 2 shows an embodiment of an optical wireless network in which one access point 20 (AP) may send data to and receive data from each of two stations 22 and 24 (STA1 and STA2). Although only two stations are shown in FIG. 2, in other embodiments any appropriate number of stations may be present in the optical wireless network. The optical wireless network may comprise multiple access points, with each AP being optically connected to one or more stations.

The access point 20 comprises a light source 25 which may be used to send data by modulation of light. In the present embodiment, the light source is an LED lamp. In other embodiments, the light source may be any appropriate coherent or incoherent light source, for example a laser light source. The access point 20 also comprises a light detector 26 (for example, a photodiode) that may be used to receive modulated light. The access point 20 is configured to decode the received light to obtain data. Each of the stations 22, 24 also comprises a light source 27a, 27b and a light detector 28a, 28b. Different devices (access point 20, station 22, station 24) may have the same or different light sources and/or light detectors.

Each of the access point 20 and stations 22, 24 also includes a suitable processing resource (not shown) for processing received data or data to be transmitted and suitable encoding/decoding and/or modulation/demodulation circuitry (not shown), for example processing resources and circuitries configured to implement IEEE 802.11 transmission schemes. The processing resource may comprise software, hardware or any suitable combination of software and hardware and, for example, may include one or more ASICs or FPGAs.

In the present embodiment, downlink data (data sent from the access point 20 to one of the stations 22, 24) is sent using visible light. Light source 25 is configured to transmit visible light and light detectors 28a, 28b are configured to receive visible light. Uplink data (data sent from one of the stations 22, 24 to the access point 20) is sent using infrared light. Light sources 27a, 27b are configured to transmit infrared light and light detector 26 is configured to receive infrared light.

In other embodiments, any suitable frequency or frequencies of light (for example, including infrared, visible or ultraviolet light) may be used for the uplink and downlink. For example, any electromagnetic radiation with a wavelength between 10 nm and 2500 nm may be used, with different wavelengths being used for uplink and downlink.

Using different frequency bands (for example, visible and infrared) for uplink and downlink may allow for full duplex operation. Any one of the access point 20 or stations 22, 24 may receive and transmit data simultaneously. For example, the access point may receive uplink data that is sent using infrared light while sending downlink data using visible light.

In the embodiment of FIG. 2, the access point 20 is connected to a wired data link, for example to an Ethernet link (not shown). The stations 22, 24 may be each be connected to or be part of a computer or other device (not shown). For example, each station may be connected to or form part of a mobile communications device such as a cellphone, laptop computer or tablet computer.

Figure 4:
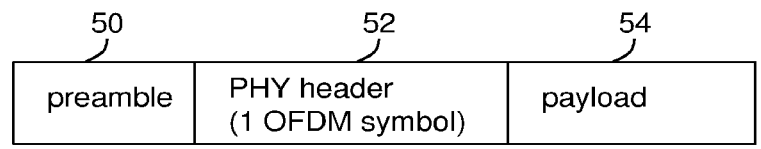
FIG. 4 is a schematic diagram representative of a PHY packet format.

Data is sent between the access point and stations using physical layer (PHY layer) packets. A PHY layer packet may comprise a preamble 50, PHY header 52 and payload 54, as illustrated in FIG. 4. The payload may comprise any appropriate Media Access Control layer (MAC layer) frame, for example a data frame. The MAC layer frame comprises a MAC header, which may be referred to as a normal MAC header or 802.11 MAC header (in contrast with a high reliability MAC header which is described below).

In the 802.11 standard, the PHY header comprises one OFDM symbol. The PHY header of the 802.11 standard does not comprise address information.

In the present embodiment, a PHY header is used that may be described as a modified version of an 802.11 PHY header. In the PHY header that is used in this embodiment, a number of bits of the PHY header are freed up, and are then used to represent address information.

In the 802.11 standard, 4 bits of the PHY header are used to include modulation type and channel coding rate information. Each available combination of modulation type and channel coding rate may be referred to as a mod/rate pair. In 802.11, 8 mod/rate pairs are available.

The 8 mod/rate pairs used in 802.11 are encoded in 4 bits in the 802.11 standard. However, it is possible to encode the 8 mod/rate pairs in 3 bits. In the present embodiment, the 8 mod/rate pairs are encoded in 3 bits. Therefore one bit becomes free for use in addressing.

The 802.11 standard allows payloads between 1 and 4095 bytes. In the present embodiment, the payload length is a multiple of 32 bits and the maximum length is around 1500 bytes due to a common 1500 byte payload limit in networks. Therefore, the MSB (most significant bits) and the two LSBs (least significant bits) that are used for the payload length in 802.11 become free for use in addressing in the present embodiment.

Four bits of the PHY header are released for use in the present embodiment (one mod/rate bit and three bits from payload length). The four bits that are released are used to encode address data. Therefore the number of STAs that may be addressed in the PHY header is limited to 16. In other embodiments, different circumstances (for example, a different maximum payload length) may result in a different number of bits in the PHY header being available for addressing.

In the present embodiment, a first part of each PHY packet comprising the preamble and the PHY header is sent at a first transmission rate, and a second part of each PHY packet comprising the payload is sent at a second, faster transmission rate. The first transmission rate may comprise a first modulation rate and/or channel coding rate. The second transmission rate may comprise a second modulation rate and/or channel coding rate. The first part of the packet is sent at a slower transmission rate so that the sending of the first part of the packet is more robust than the sending of the second part of the packet. In other embodiments, the first part and second part of the packet may be sent at the same transmission rate. In further embodiments, any two or more parts of the packet may be sent at different rates.

Figure 3:
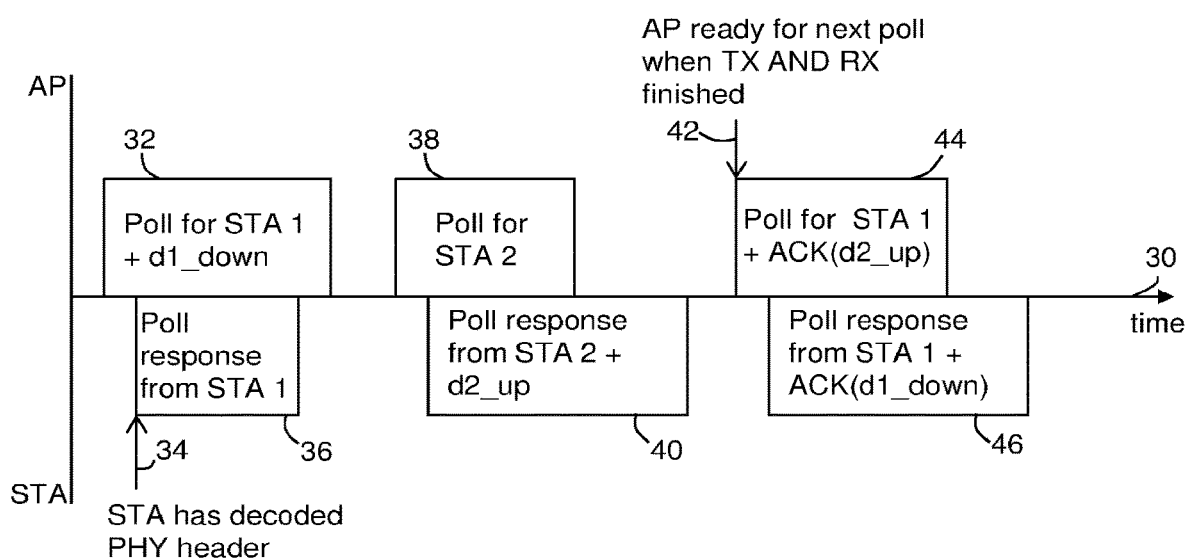
FIG. 3 is a schematic diagram representative of an AP polling two STAs using a polling scheme in accordance with an embodiment.

FIG. 3 is a timing diagram illustrating a polling method in accordance with an embodiment. The polling method is implemented on a network similar to that of FIG. 2, which comprises one access point (AP) and two stations (STA1, STA2). In other embodiments, up to 16 stations may be polled by one access point. The access point may poll all the stations in the network in turn.

The polling method of the present embodiment makes use of the separate uplink and downlink frequencies to provide a method which may be faster than the 802.11 PCF method when used in optical communications.

A timeline 30 is represented in FIG. 3. Time on timeline 30 runs from left to right. Blocks above the timeline 30 represent downlink packets sent by the AP. Blocks below the timeline 30 represent uplink packets sent by the stations.

At block 32, the AP polls the first station, STA1, by sending a poll packet addressed to STA1. The address of STA1 is encoded in the PHY header of the poll packet. The poll packet comprises payload data d1_down.

In the present embodiment, the AP sends a first part of the poll packet comprising the preamble and the PHY header at a first transmission rate, and sends a second part of the poll packet comprising the payload data d1_down at a second, faster transmission rate.

Both stations STA1 and STA2 start to receive and decode the poll packet of block 32. Once it has decoded the PHY header, station STA1 knows that the poll packet is addressed to it. Arrow 34 indicates the time point at which the PHY header has been decoded. Station STA2 determines that the poll packet is not addressed to it and takes no action at this stage.

As soon as STA1 has decoded the PHY header and determined from the address included in the PHY header that the poll packet is addressed to it, STA1 sends a response packet as a response to the poll from the AP. This poll response is illustrated by block 36. STA1 does not wait until the poll packet of block 32 has been completely received and decoded before sending the response packet. STA1 is able to send a response packet while still receiving and decoding the poll packet. The AP receives and decodes the poll response from STA1 while the AP is still transmitting the poll packet. The poll response of block 36 does not include payload data in this example. The entire response packet of block 36 is received by the AP while the AP is still transmitting the poll packet.

In the example of FIG. 3, the AP finishes sending the first poll packet (block 32) after it has received the poll response from STA1 (block 36). The AP determines that it has finished transmitting and that no packet reception is ongoing. The AP therefore proceeds to send a second poll packet (block 38). This time the poll packet is addressed to STA2 and does not include payload data.

The stations STA1, STA2 receive and decode the second poll packet 38. STA2 determines from the PHY header that the second poll packet is addressed to it and sends a response packet (shown by block 40) without waiting to receive and decode the rest of the second poll packet. In this example, STA2 also sends data d2_up in the poll response packet of block 40.

The sending of the poll response packet of block 40 is initiated while the second poll packet 38 is being sent, and continues after the sending of the second poll packet is finished.

The AP waits till both transmission (block 38) and reception (block 40) are complete. In this example, reception of the response packet of block 40 lasts longer than the transmission of the poll packet of block 38, so the AP waits until the reception is complete. A point at which transmission and reception are complete is indicated on FIG. 3 by arrow 42.

The AP then sends a third poll packet which is addressed to STA1 (block 44). The sending of the third poll packet to STA1 may be considered to be the start of a second polling cycle, where each polling cycle comprises polling STA1 and polling STA2.

The third poll packet (block 44) comprises an acknowledgement (ACK) of receipt of data d2_up which has been received (block 40) from STA2. The ACK is intended for STA2 even though the poll packet is addressed to STA1. An ACK for STA2 may be carried in a poll packet addressed to STA1, because all stations receive and decode all poll packets, and thus STA2 will be able to receive and decode the ACK intended for it.

In the present embodiment, all stations receive and decode all poll packets and may discard any received information that is unneeded. However, in alternative embodiments, a receiver of a given STA may be stopped once an address of a packet tells the STA that the payload of that packet is for another STA (and therefore is not for the given STA). Stopping the receiving of the packet by the given STA once the given STA has established that the packet is not addressed to it may be used for power saving, for example power saving in mobile devices.

At block 46, STA1 responds to the third poll packet (block 44). STA1 responds to the third poll packet by sending a response packet as soon as it has decoded the PHY header of the third poll packet which is addressed to it, and without waiting to decode the whole of the third poll packet. STA1 includes in its poll response an acknowledgement (ACK) of the data d1_down that was sent in the first poll packet addressed to STA1.

Although not illustrated in FIG. 3, the AP continues to send poll packets alternately to STA1 and STA2. The AP sends a next poll packet when its previous transmission of packets has finished and no packet reception is ongoing.

In general, if the AP sends a downlink packet to an STA in one polling cycle, that STA acknowledges the downlink packet at the next polling cycle.

When an STA is polled, it sends an uplink packet to the AP as a response to the polling. The uplink packet may also contain additional payload data. The subsequent ACK for the payload data in this uplink packet is then provided in the next poll packet sent by the AP, even if the next poll packet is addressed to a station that is different from the station that sent the uplink packet. All stations receive all poll packets.

In some circumstances, a packet may be lost. This situation may be considered with reference to FIG. 3. As already described, the AP transmits a first poll packet (block 32) that also contains payload data (d1_down) to STA1. When the AP is ready to transmit a further poll packet (block 44) to STA1, the AP does not yet know whether the data (d1_down) sent to STA1 in the first poll packet has been received or not (as can be seen from FIG. 3, the ACK in respect of receipt of d1_down is only sent at block 46). Although STA1 sent a response packet on receiving the PHY header of the first poll packet (block 32) it is possible that the PHY header was received correctly by STA1 but that the rest of the packet (including data d1_down) was not. For data transmitted to STA1 in the first polling cycle, the AP cannot receive an ACK for that data from STA1 until the second polling cycle.

The AP goes ahead and transmits the further poll packet (in this case, the third poll packet) without knowing whether the first poll packet was received correctly. If no ACK for the first poll packet is received at block 46, the AP transmits the first poll packet again at a subsequent polling cycle.

Considering packet loss more generally, consider a situation in which the AP has to transmit packets p1 and p2 to one station (for example, to STA1). Each of packets p1 and p2 may contain payload data. When the AP is ready to transmit p2, it still does not know if p1 went through or not, so it just goes ahead and transmits p2. If no ACK for p1 is received, the AP will transmit p1 again (in a further polling cycle). Therefore, the STA may receive the packets in the wrong order, e.g. p2, p1. If this happens, packets can be sorted by the STA, for example using sequence numbers such as sequence numbers issued by the mac80211 stack or by using any other suitable sorting technique.

In the present embodiment, a STA aborts an ongoing transmission if it receives any poll packet (whether addressed to it or not). The aborting of the ongoing transmission accounts for the case of a packet reception failure at the AP. If packet detection on the AP fails, the AP is not aware of an ongoing uplink packet and sends the next poll packet. Consider, for example, blocks 38, 40 and 42 of FIG. 3. If the AP does not receive the response packet of block 40, the AP may send the poll packet 42 before STA2 has finished transmitting the response packet of block 40. STA2 aborts the transmission of the response packet of block 40 on receiving the poll packet of block 44. In such circumstances, the transmitting STA aborts the ongoing uplink packet in order to avoid corruption of the channel. The aborted packet is resent by the STA at the next polling cycle.

In the method illustrated in FIG. 3, a station responds to a poll from the AP as soon as it recognizes its address in the PHY header. Responding as soon as it recognises its address may be faster and more reliable than a method in which a station must receive and decode the entire poll packet (possibly including a substantial data payload) before responding to the poll packet.

It may be seen in FIG. 3 that the downlink packets overlap in time with the uplink packets, using the channel in full duplex mode. The polling scheme shown in FIG. 3 may be described as a modified full duplex polling scheme. The PCF multiple access method is modified for full duplex operation because optical communications systems often use visual light for the downlink and infrared radiation for the uplink, allowing full duplex operation. A bidirectional PCF algorithm is therefore provided. The algorithm of the present invention is a full duplex algorithm in which a device may receive a poll packet and send a response packet simultaneously, or send a poll packet and receive a response packet simultaneously.

Unlike 802.11, no coexistence with DCF is required. Therefore, there is no need to observe a certain timing. The AP and STAs may send the packets as fast as they can. The polling scheme may enable the implementation of full duplex Time Division Multiple Access (TDMA) for the optical communication system.

The method described with reference to FIG. 3 may scale well to user demand. Assume STA1 is idle and STA2 has lots of data. STA2 can use almost the whole capacity of the network, sending and receiving long data packets while STA1 receives and sends only poll packets and poll response packets. If STA1 also has data, STA1 may occupy more of the channel capacity while the throughput for STA2 is reduced. If both STAs demand more throughput than is possible, each STA will get about 50% of the capacity, assuming that the same modulation is used for both STAs.

In the embodiment described above with reference to FIG. 3, an address of the STA that is being addressed in a poll packet is contained in the PHY header of the poll packet using bits of the PHY header.

Figure 5:
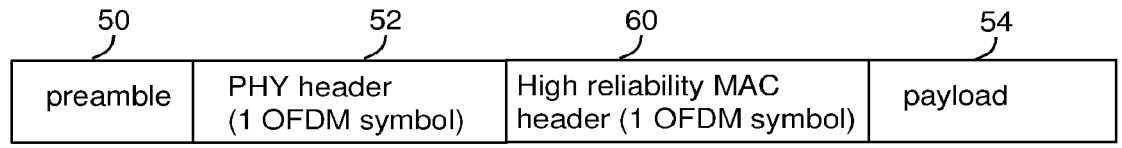
FIG. 5 is a schematic diagram representative of a PHY packet format in accordance with an embodiment.

In an alternative embodiment, the PHY packet format is different from that illustrated in FIG. 4. The alternative PHY packet format is illustrated in FIG. 5. A high reliability MAC header is added to the PHY packet format, in addition to the PHY header. The high reliability MAC header is in addition to the MAC header in the MAC layer frame. In the present embodiment, the high reliability MAC header is 1 OFDM symbol long. In some embodiments, the PHY packet with the high reliability MAC header may be used for any wireless communications, whether or not the channel is full duplex.

A first part of a packet including a preamble 50 and PHY header 52 may be sent at a first modulation rate and/or channel coding rate, and a second part of the packet including a payload 54 may be sent at a second, faster modulation rate and/or channel coding rate.

However, sending packet acknowledgements at a high order modulation may increase the probability of a loss of the ACK. Loss of the ACK may cause retransmission of the corresponding payload (the payload that the ACK was supposed to acknowledge).

A loss of a packet that contains both an ACK and a payload may cause two additional transmissions to be required, one for the payload that the ACK was supposed to acknowledge, and one for the payload that has been lost in the lost packet.

If, for example, the downlink channel experiences a degradation, the uplink may also be greatly affected due to the lost ACKs. If ACKs are lost on the degraded downlink channel, the STAs do not know that their uplink packets have been received and therefore need to resend them, slowing the uplink channel.

In the embodiment of FIG. 5, and in a variant of FIG. 3, ACKs may be placed in the high reliability MAC header 60. The headers (PHY header 52 and high reliability MAC header 60) are sent at the lowest possible modulation and channel coding rate (BPSK, r=1/2) which means that the reception of the PHY header 52 and high reliability MAC header 60 is likely to be reliable. Even if the payload is corrupted, the ACK may still be received correctly. In the present embodiment, the second part of the packet, including the payload, is sent at the highest rate that the channel allows.

It may be that a coupling between downlink and uplink performance is reduced or eliminated by use of the different transmission rates for ACKs and payloads, for example a coupling between the level of degradation of the downlink channel and a level of degradation of the uplink channel. A downlink degradation like reduced SNR (signal to noise ratio) due to misalignment may have very little effect on the uplink and vice versa. A cause of degradation that affects only one of uplink or downlink may not also affect the other due to missed ACKs. There may be some reduction in throughput due to the introduction of the additional header (the high reliability MAC header 60) but, at least in some circumstances, the benefit of the reliable ACK transmission may outweigh the minor reduction in throughput.

The robustness of 802.11 PCF or of the full duplex method described above with relation to FIG. 3 may be improved by the modification of the PHY packet format to include the high reliability MAC header 60.

In further embodiments, the high reliability MAC header 60 may be used for other purposes. For example, the high reliability MAC header 60 may be used for addressing the STAs. In the embodiment described above with relation to FIG. 3, the STAs are addressed by reusing bits in the PHY header. Addressing the STAs using bits in the PHY header may limit the number of STAs to 16. Addressing the STAs in the high reliability MAC header 60 rather than the PHY header 52 may increase the number of STAs that can be addressed by one AP while retaining benefits of including the address in a header. An STA may respond to its address in a header before it decodes the rest of the poll packet. By including the address in the high reliability MAC header rather than in the normal MAC header which is part of the MAC frame in the payload, the STA does not have to decode the payload in order to obtain its address.

In the embodiment of FIG. 3, a STA responds to a poll packet as soon as it decodes its address. In further embodiments, the STA responds to a poll packet addressed to it as soon as it receives the preamble of the poll packet, without waiting to receive the address of the poll packet.

In one such embodiment, a different polling response logic is used from that described above with reference to FIG. 3.

Each STA learns the polling sequence used by the AP and knows when its turn is in the sequence. Therefore, each STA can learn when to expect a poll packet to be addressed to it by using the address of at least one previous poll packet. When a STA receives a packet addressed to the STA that is immediately before it in the sequence, it sends a response packet in response to the next poll packet. It sends that response packet on decoding the preamble of the next poll packet, without decoding the rest of the next poll packet. The response packet is therefore sent without decoding the address of the poll packet to which it is responding.

In one example, four STAs are connected to an AP. The four STAs have STA addresses 0, 1, 5 and 6. The AP polls each of the STAs in turn, i.e. the AP polls STA 0 first, STA 1 second, STA 5 third and STA 6 fourth in each cycle.

Each STA receives all packets sent by the AP. The STA with address 5 knows that after it has received a packet addressed to STA 1, the next time slot is the one in which it (STA 5) is going to be polled. Therefore, after STA 5 has received a poll packet addressed to 1, it sends a poll response when it detects the preamble of the next poll packet. STA 5 does not even wait until it has received its own address before sending a response packet, because it knows from receiving the packet addressed to STA1 that the next packet in turn should be addressed to STA 5.

By sending a poll response at the detection of the preamble of the packet addressed to it, downlink and uplink packets overlap more and throughput may be increased.

In one embodiment, a given STA uses only the address of the STA that is before it in the sequence to determine when it is going to be polled. In the example above, when STA 5 receives a poll packet addressed to STA 1, it determines that the next poll packet will be addressed to it (STA 5). In other embodiments, a given STA may use the addresses of multiple STAs to determine when it is going to be polled. For example, when STA 5 has received a poll packet addressed to STA 0 followed by a poll packet addressed to STA 1, it determines that the next poll packet will be addressed to it (STA 5).

In some embodiments in which an STA determines the address of a poll packet addressed to it by using the address of at least one previous poll packet, addresses are not included in a PHY header or other header before the payload (for example, a high reliability MAC header). Even in embodiments in which the address is not included in the PHY header or in a high reliability MAC header, an STA does not have to wait to receive and decode the whole of a poll packet addressed to it before it responds. It determines that the poll packet is addressed to it by using the address of at least one previous packet. Therefore it responds to the poll packet addressed to it as soon as it receives the preamble of the packet addressed to it, and before it decodes its address in that poll packet.

In a further embodiment, each STA only responds to some of the poll packets addressed to it, instead of responding to every poll packet addressed to it. If there is no uplink data or ACK for a given station to transmit, that STA responds to poll packets only one in a while. For example, the STA may respond just often enough to let the AP know that it is still present. The STA may respond to a predetermined proportion of the poll packets addressed to it, for example to every fifth poll packet that is addressed to it. Alternatively, the STA may respond at predetermined time intervals.

Responding to only some of the poll packets may increase throughput, since AP poll packets may be spaced more closely if no response to each poll packet is received. Responding to only some of the poll packets may improve power efficiency of the STA. Improving power efficiency may be important for mobile devices.

Whilst components of the embodiments described herein have been implemented in software, it will be understood that any such components can be implemented in hardware, for example in the form of ASICs or FPGAs, or in a combination of hardware and software. Similarly, some or all of the hardware components of embodiments described herein may be implemented in software or in a suitable combination of software and hardware.

It will be understood that the present invention has been described above purely by way of example, and modifications of detail can be made within the scope of the invention. Each feature disclosed in the description, and (where appropriate) the claims and drawings may be provided independently or in any appropriate combination.

The invention claimed is:

1. A wireless communication method, the method comprising:
 sending by a first device in a wireless network a first poll packet for polling a second device in the wireless network as part of a polling sequence that polls the second device and at least one further device, wherein the first poll packet comprises an address of the second device;
 receiving and at least partially decoding by the second device the first poll packet; and
 sending by the second device over a channel of the wireless network, in response to the first poll packet, a response packet, wherein:
the channel is also used by said at least one further device for sending response packets;
the capacity of the channel is shared by the second device and the at least one further device for sending packets that comprise payload data and/or acknowledgement messages;
the polling sequence comprises at least the first poll packet and a second poll packet in a desired order; and
the first device is configured to repeat transmission of the first poll packet as part of the polling sequence until an acknowledgement of the first poll packet by the second device is received by the first device.

2. A method according to claim 1, wherein the second device is configured to re-order the first poll packet and the second poll packet if received by the second device in an incorrect order.

3. A method according to claim 2, wherein the second device is configured to perform the reordering based on sequence numbers of the packets.

4. A method according to claim 1 wherein the polling sequence comprises a repeating polling cycle, and the polling cycle comprises transmission by the first device at least the first poll packet and the second poll packet in the desired order.

5. A method according to claim 4, wherein said repeating of transmission of the first packet is performed up to a predetermined maximum number of times.

6. A method according to claim 1, wherein the sending of at least part of the response packet by the second device is substantially simultaneous with the receiving of at least part of the first poll packet by the second device.

7. A method according to claim 1, wherein at least part of the response packet is sent before completion of said at least partial decoding of the first poll packet.

8. A method according to claim 1, further comprising:
 as part of the polling sequence, sending by the first device to the further device or one of the further devices a previous poll packet before said sending of the first poll packet;
receiving and at least partially decoding by the second device the previous poll packet before the receiving and at least partial decoding of said first poll packet, wherein the sending of the response packet by the second device is dependent on the address of the further device and on the polling sequence, in which the further device comes before the second device.

9. A method according to claim 8, wherein said first poll packet further comprises a preamble before the address of the second device, the second device detects the preamble of the first poll packet and sends the response packet in response to said detection without waiting to receive its own address by the decoding of the first poll packet.

10. A method according to claim 9, wherein the polling sequence comprises a sequence of poll packets addressed to different devices, and the sending of the response packet in response to the decoding of at least part of the preamble is performed in dependence on the address of a least one preceding poll packet in the sequence of poll packets.

11. A method according to claim 1, wherein the sending of the response packet by the second device is after a detecting of the first poll packet by the second device and before the at least partial decoding of the first poll packet by the second device.

12. A method according to claim 1, wherein the sending of the first poll packet is on a first channel and the channel on which the response packet is sent is a second, different channel, wherein the first channel and second channel form a full duplex connection between the first device and second device.

13. A method according to claim 12, wherein the first channel comprises a visible light downlink and the second channel comprises an infrared uplink.

14. A method according to claim 1, wherein at least one of a), b) or c):
 a) the first poll packet comprises a physical layer (PHY) packet, that includes a physical layer header, and the address of the second device is provided in the physical layer header;
 b) the first poll packet further comprises at least one further header, for example a MAC header, that includes an acknowledgement message;
 c) the first poll packet further comprises payload data and/or an acknowledgement message, and the method comprises sending by the second device the response packet before, or without completing, decoding of the payload data and/or acknowledgement message.

15. A method according to claim 1, wherein the first poll packet comprises at least one portion that is addressed to a further device.

16. A method according to claim 15, wherein said at least one portion comprises at least one of a payload or an acknowledgement message.

17. A method according to claim 1, wherein the sending of the first poll packet by the first device comprises sending a first part of the first poll packet using a first rate and sending a second part of the first poll packet using a second, different rate, the first part of the first poll packet comprising the address of the second device.

18. A method according to claim 17, wherein at least one of a) or b):
 a) the first and second rates comprise first and second modulation rates and/or channel coding rates;
 b) the first poll packet or response packet comprises an acknowledgement message, and the acknowledgement message is provided in the first part of the first poll packet or response packet.

19. A method according to claim 1, wherein the sending of the response packet by the second device comprises sending a first part of the response packet using a first rate, and sending a second part of the response packet using a second, different rate.

20. A method according to claim 1, wherein the first device is further configured to send subsequent poll packets to the second device and to said at least one further device in the repeating polling sequence.

21. A method according to claim 20, wherein at least one of a) or b):
  a) the first device is configured to send one or more of the subsequent poll packets only if the transmission of the first poll packet is complete and no packet reception by the first device is occurring;
  b) the method further comprises aborting by the second device the transmission of the response packet if the second device receives a further poll packet from the first device during transmission of the response packet.

22. A method according to claim 1, wherein the polling sequence comprises sequence of poll packets for polling the second device, and wherein the second device is configured to respond to some and not all of the sequence of poll packets for polling the second device.

23. A wireless communication system comprising:
  a first device configured to transmit a first poll packet for polling a second device, the poll packet comprising an address of the second device as part of a polling sequence that polls the second device and at least one further device; and
    the second device, wherein the second device is configured to:
      receive and at least partially decode the first poll packet; and
      to send, in response to the first poll packet a response packet over a channel of a wireless network, wherein
    the channel is also used by said at least one further device for sending response packets, and the capacity of the channel is shared by the second device and the at least one further device for sending packets that comprise payload data and/or acknowledgement messages; and
    the polling sequence comprises at least the first poll packet and a second poll packet in a desired order; and
    the first device is configured to repeat transmission of the first poll packet as part of the polling sequence until an acknowledgement of the first packet by the second device is received by the first device.

24. A receiver configured to receive and at least partially decode a first poll packet, and to send a response packet in response to the first poll packet over a channel of a wireless network, wherein
  the channel is also used by at least one further device for sending response packets, and the capacity of the channel is shared by the second device and the at least one further device for sending packets that comprise payload data and/or acknowledgement messages; and
  the polling sequence comprises at least the first poll packet and a second poll packet in a desired order; and
  the first device is configured to repeat transmission of the first poll packet as part of the polling sequence until an acknowledgement of the first poll packet by the second device is received by the first device.

* * * * *